US011954646B2

United States Patent
Davis et al.

(10) Patent No.: US 11,954,646 B2
(45) Date of Patent: *Apr. 9, 2024

(54) SYSTEMS AND METHODS FOR MANAGEMENT OF NETWORKED COLLABORATION

(71) Applicant: Open Text Corporation, Waterloo (CA)

(72) Inventors: Cornelia R. Davis, Santa Barbara, CA (US); Kenwood Y. Tsai, Palo Alto, CA (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,807

(22) Filed: Jan. 24, 2023

(65) Prior Publication Data

US 2023/0169465 A1 Jun. 1, 2023

Related U.S. Application Data

(63) Continuation of application No. 16/049,085, filed on Jul. 30, 2018, now Pat. No. 11,568,365, which is a (Continued)

(51) Int. Cl.
*G06Q 10/10* (2023.01)
*G06Q 10/101* (2023.01)
*G06Q 10/1093* (2023.01)

(52) U.S. Cl.
CPC ......... *G06Q 10/101* (2013.01); *G06Q 10/103* (2013.01); *G06Q 10/1095* (2013.01); *G06Q 10/1097* (2013.01)

(58) Field of Classification Search
CPC ............. G06Q 10/101; G06Q 10/1097; G06Q 10/1095; G06Q 10/103
See application file for complete search history.

(56) References Cited

U.S. PATENT DOCUMENTS 6,336,118 B1 * 1/2002 Hammond ............... G06F 8/36
6,336,134 B1 * 1/2002 Varma ................. H04L 12/1813
709/204

(Continued)

FOREIGN PATENT DOCUMENTS

WO WO 02/099660 A1 * 12/2002 ............. G06F 13/00
WO WO 03/034208 A2 * 4/2003 ............... G06F 9/40

(Continued)

OTHER PUBLICATIONS

S.C.Hui, "Data Mining for Customer Service Support," 2000, Information and Management 38, 2000, pp. 1-13. (Year: 2000).*

(Continued)

*Primary Examiner* — Tan D Nguyen
(74) *Attorney, Agent, or Firm* — Sprinkle IP Law Group

(57) ABSTRACT

A system for management of networked collaboration comprising a process server communicatively coupled to a content server and a collaborative workspace server. The process server hosts a process configured to invoke a first collaborative workspace method that invokes a first class on the content server. The first class is configured to send, to the collaborative workspace server, a request to create a new collaborative object. The collaborative workspace server hosts a collaborative workspace accessible by a plurality of users. The collaborative workspace server creates the new collaboration object responsive to the request to create the new collaborative object. The process server creates first proxy object that points to the new collaboration object. The content server creates a first reference object that links to the new collaborative object. The collaborative workspace server receives, processes and responds to actions on the first proxy object.

20 Claims, 6 Drawing Sheets

Related U.S. Application Data continuation of application No. 11/227,254, filed on Sep. 16, 2005, now abandoned.

(60) Provisional application No. 60/626,096, filed on Nov. 8, 2004.

(56) References Cited

U.S. PATENT DOCUMENTS

| | | | |
|---|---|---|---|
| 2002/0049786 A1* | 4/2002 | Bibliowicz | G06F 3/04812 715/234 |
| 2002/0129175 A1* | 9/2002 | Banavar | G06Q 10/00 719/310 |
| 2004/0152036 A1* | 8/2004 | Abolfathi | A61C 7/00 433/24 |
| 2006/0053196 A1* | 3/2006 | Spataro | H04L 65/403 709/205 |
| 2006/0053380 A1* | 3/2006 | Spataro | G06Q 10/10 709/204 |
| 2006/0085245 A1* | 4/2006 | Takatsuka | G06Q 10/10 705/7.12 |
| 2009/0089379 A1* | 4/2009 | Pegg | H04L 51/04 709/204 |
| 2009/0089682 A1* | 4/2009 | Baier | G06Q 10/10 715/751 |
| 2009/0169365 A1* | 7/2009 | Andersson | F04D 7/045 415/121.1 |

FOREIGN PATENT DOCUMENTS

| | | | | |
|---|---|---|---|---|
| WO | WO-2013098830 A1 * | 7/2013 | | G06F 17/3089 |
| WO | WO-2015036817 A1 * | 3/2015 | | G06F 16/9535 |
| WO | WO-2016203469 A1 * | 12/2016 | | |

OTHER PUBLICATIONS

Farzad Shafiei, "Multi-Enterprise Collaborative Enterprise Resource Planning and Decision Support Systems," 2004, Proceedings of the 27th Hawaii International Conference on System Sciences, pp. 1-10. (Year: 2004).*

Yoon=Eui Nahm, "Integrated Product and Process Modeling for Collaborative Design Environment," 2004, Concurrent Engineering: Research and Applications, pp. 5-23. (Year: 2004).*

Jessica Rubart, "Organizing Shared Enterprise Workspaces Using Component-Based Cooperative Hypermedia," 2001, Integrated Publication and Information Systems Institute, pp. 73-82. (Year: 2001).*

* cited by examiner

SYSTEMS AND METHODS FOR MANAGEMENT OF NETWORKED COLLABORATION

RELATED APPLICATIONS

This application is a continuation of, and claims a benefit of priority under 35 U.S.C. 120 of the filing date of U.S. patent application Ser. No. 16/049,085 filed Jul. 30, 2018, entitled "Systems and Methods for Management of Collaborative Business Processes," issued as U.S. Pat. No. 11,568,365, which is a continuation of, and claims a benefit of priority under 35 U.S.C. 120 of the filing date of U.S. patent application Ser. No. 11/227,254 filed Sep. 16, 2005, entitled "Systems and Methods for Management of Collaborative Business Processes," which is a conversion of and claims the benefit of U.S. Provisional Application No. 60/626,096 filed Nov. 8, 2004, entitled "Systems and Methods for Management of Collaborative Business Processes," all of which are incorporated herein by reference in their entirety.

FIELD OF THE INVENTION

The present invention is related to systems and methods for the automated management of collaborative business processes and, in particular, to the automatic creation, tracking, and management of collaborative business objects.

BACKGROUND

Documentum™, E-Room™, and EMC™, are trademarks and/or registered trademarks of Documentum Inc., and/or EMC Inc.

Today, most organizations of even moderate size use business process management (BPM) systems to guide and manage business activities. Although current BPM systems may be well-suited to helping with a series of preplanned, standalone business activities, organizations often perform unstructured, unplanned activities in conjunction with a business process, such as various employees collaborating to discuss or resolve an issue related to a business process. Currently available BPM systems and software does not provide for a mechanism to allow unstructured, collaborative activity to be integrated into the highly structured business process management environment.

It is desirable, especially in an increasingly distributed and collaborative business environments, to provide mechanisms that allow collaborative activities in the BPM context. It is desirable to provide a BPM system that can automatically invoke and configure team collaboration workspace for a specific task, and use collaborative objects as process data within the BPM system. It is desirable to have a BPM system that provides application-agnostic innate support for collaboration and collaboration objects. It is also desirable to associate a collaborative item with a BPM item or process, making the collaborative item accessible through the BPM system. It is also desirable to have a set of collaborative object types integrated into a BPM system. It is also desirable to audit collaborative objects as part of a business process and have a collaboration object become a saved part of the business process. Further, it is desirable to provide an organization with visibility into collaborative events and processes that occur external to the organization's BPM system.

DESCRIPTION OF EXEMPLARY EMBODIMENTS

Figure 1:
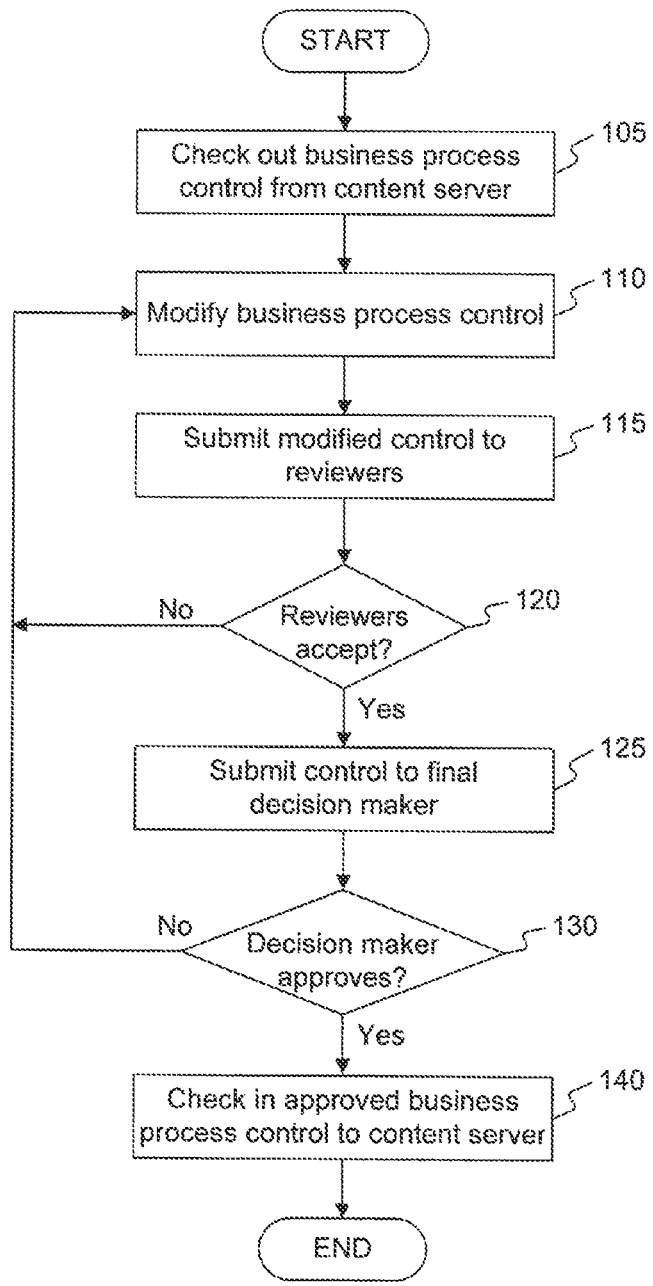
FIG. 1 is a flow chart of a conventional FPM process for modifying a business process control.

Advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that the following detailed description is exemplary and explanatory only and is not restrictive of the invention, as claimed.

Reference will now be made in detail to exemplary embodiments of the invention, examples of which are illustrated in the accompanying drawings. Wherever convenient, the same reference numbers will be used throughout the drawings to refer to the same or like parts.

Overview

Business process management ("BPM") may be defined as the practice of improving the efficiency and effectiveness of any organization by automating the organization's business processes. BPM software and systems allow activities to be associated with a business process and provide tools to monitor these activities, as well as carry out their automated execution. For example, BPM systems, such as workflow systems, XML Business Process languages and packaged ERP systems, may provide tools to create a workflow, an order, or a sequence of activities associated with the business process. Additionally, BPM systems may also provide tools to create schedules for the individual activities in the workflow. A global schedule may then be created based on the information input for the individual activity schedules and the business process workflow using the BPM system.

Conventional automated BPM systems employ workflow engines that control process flows, automatically measure progress, and generally shepherd workitems through a well-defined, highly structured, multi-step process. Business processes act upon and manage information and data items known as "process data." Conventional process data may include forms, documents, spreadsheets, invoices, and database rows. The task context for each step in a business process is called a workitem. Workitems generally include references to the appropriate process data necessary to carry out the task, as well as to the performer(s) of the task. BPM systems generally identify and track business items, such as expense reports, travel requests, purchase orders, new account authorizations, credit authorizations, sales orders, etc., as they move through each step of a process and enforce procedures carried out by specified people or applications as they process the information associated with each item during a step.

Problems arise, however, when organizations seek to perform unstructured activities as part of a business process.

Yet, unstructured activities, such as various employees collaborating to discuss or resolve an issue, are often necessary to perform a step in a business process. Currently available BPM software does not provide for a mechanism to allow unstructured, collaborative activity to be integrated into the highly structured business process management environment. For example, if a document such as a purchase order requires the approval of several parties, the document is sent to a number of individual parties for approval. With current systems, each party may either approve or reject the document; their choices are binary and very limited. There is no mechanism, for example, to allow an assigned individual, as part of an approval task, to open a dialog with other individuals, or solicit feedback, or request supporting materials in a manner that is controlled and tracked by the structured business process. In general, there is no mechanism to allow for the creation, definition, tracking, management, and integration of collaborative activities in a BPM environment, which limits the utility of BPM software in many organizations. Traditional systems lack the ability to audit collaborative objects as part of a business process.

Currently, BPM system users sometimes work outside an organization's BPM system to collaborate on business process tasks. For example, a manager may email a request to relevant employees asking them to resolve issues related to a BPM item tasked to the manager. The employees collaborate to tackle the issue with whatever ad hoc tools are available, such as email, getting together in conference room, sharing and emailing files, using the track-changes functions in Word™ documents, etc. To get the work done, the employees typically need to access relevant information, work with other employees, share ideas and output, and make decisions. Eventually, they resolve the issue and return to the BPM process with a final result, but the BPM system has no indication of what went on during the collaboration process, and hence the collaborations cannot ever become a part of the business process record.

For another example, consider a step in a BPM workflow that requires an external party, such as a vendor, to approve a product specification. Conventional BPM systems have no way to connect to or manage an outside approval process. To perform this action, the workflow actor would typically email a specification document to the external vendor and wait for some sort of response. The document and approval process move outside of the BPM process, and the organization has no information regarding what is happening, or what happened, during vendor approval. The external process is essentially a black box to the organization and BPM system—they see only the input and the output.

There are several other problems with ad hoc collaboration outside of the BPM system. Outside the BPM system, efficiency is lost due to lack of management, visibility, and control; files get lost in email and people's directories; participants cannot tell whether they are working with the latest versions of files, data, and records; participants duplicate each other's work due to uncentralized communication; decisions are made based on outdated and incomplete information; communications are unclear due to lack of context; records of document changes are not preserved; file and information security is lost; records of the collaborative process are unavailable or not kept; objects and records of the collaborative process cannot be audited or reviewed; participants are idled waiting for information; and participants have no means for determining the status of tasks, to name a few. The ability to audit and later review collaboration processes and products, in particular, may be critical in today's highly regulated business environment.

Another problem with conventional BPM systems is the lack of integrated items that support collaboration. Traditionally, in a business process the process data almost exclusively have been a specific set of keyword/value pairs (represented as a row in a database, for example, and presented to the user as a form), or a document, or set of documents, none of which are collaborative objects. Although some collaboration-like records may be available from applications used with a conventional BPM system, they are not truly collaborative, their availability is a coincidental byproduct of the tool used to create them, and they are not directly and formally managed by the BPM system. For example, user comments in a Microsoft Word™ document and the tracked changes in a Microsoft Word™ document may be available to users of a BPM system that controls the Word document, but these are features of Word, not the BPM system itself. Thus, if an organization uses a different word processor that does not have these features, then the BPM system users will not have them either. And even when it can access such information in a document, a conventional BPM system cannot manage or control the information separately, or associate it with other items, because it is inherent to a single document.

Embodiments consistent with the present invention provide systems, methods and software for business process management ("BPM") and, in particular, for the creation, tracking, and management of collaborative business objects.

Embodiments and Implementations

FIG. 1 is a flow chart of a BPM process for modifying a business process control. A BPM process may be, for example, a workflow, which is a structured process, or a series of steps, in which each step, or each node in the business process represents a discrete activity. As shown, the BPM process begins with an author checking out a business process control from a company's content server (step 105). For example, an accounts payable manager at a company may check out an accounts payable control because he or she needs to make changes in the control to support a new enterprise resource planning (ERP) system.

Next, the author modifies the checked-out business process control (step 110). When the author signals that the business process control modifications are complete, the BPM system submits the modified business process control to reviewers who need to verify the changes (step 115). Following the example, the BPM system may submit the modified accounts payable control to the general manager and the company controller for review. In the next step of the BPM process, the reviewers can accept or reject the changes to the control (step 120). If a reviewer rejects the changes (step 120, No), then the reviewer may send the rejected control back to the author for further modification (step 110) and later resubmission to the reviewers (step 115). Thus, a rejection simply results in the performer of step 110 getting the job of fixing the control. The performer may do this in any way they desire. For example, if the performer recognizes that fixing the rejected control is best done collaboratively, they must somehow choose and set up a collaboration medium, get the necessary people to use the collaboration medium, and transform the results of the collaboration into changes that fix the control. All of this happens outside the control, accounting, and recording of the BPM system.

The BPM system continues this loop until all the reviewers accept the modified business process control (step 120, Yes). The BPM system then submits the modified control to a final decision maker (step 125), who may approve or reject the modified control (step 130). To further continue the example, after the accounts payable manager has further modified the accounts payable control according to the comments of the general manager and the company controller, and the general manager and company controller have accepted the final version, the system submits the modified accounts payable control to the CFO for final approval.

If the final decision maker rejects the modified business process control (step 130, No), then it is sent back to the author, and the modification cycle begins again (step 110). If, on the other hand, the final decision maker approves the modified business process control (step 130, Yes), then the modified business process control is checked back in to the content server to become the official company version (step 140). To finish the example, when the CFO approves (i.e., signs off on) the changes to the accounts payable control, the BPM system checks it into the company's content server, where it is used to support the new ERP system.

The BPM system illustrated in FIG. 1 does not support collaboration between participants in a business process. Within the confines of the BPM system, participants are limited to very structured, typically binary, actions such as accepting or rejecting a modified document. If the participants wish to collaborate, for example, if the accounts payable manager, general manager, and company controller want to discuss what should be in the final version for the accounts payable control before submitting it to the CFO, they must do so outside the environment of the BPM system. Such collaboration occurs using whatever tools the participants happen to pick, such as emails, instant messaging, telephone calls, meetings in conference rooms, interoffice mail, and network-based tools such as chat rooms, message boards, shared objects, etc. Because the collaborative activities occur beyond the scope of the conventional BPM system, the system captures no information about the collaboration, which often includes important data about the reasons decisions were reached, changes were made, and actions were taken. Instead, a traditional BPM system such as is illustrated in FIG. 1, simply directs a task back to a specific actor when there is rejection or a workitem (e.g. the control document) or other problem (e.g., step 120, No) and the actor must recognize the problem condition, figure out how to resolve the issue, resolve the issue (which occurs outside of the business process) and then record the resolution of the issue into the workitem (e.g., revise the control document).

Figure 2:
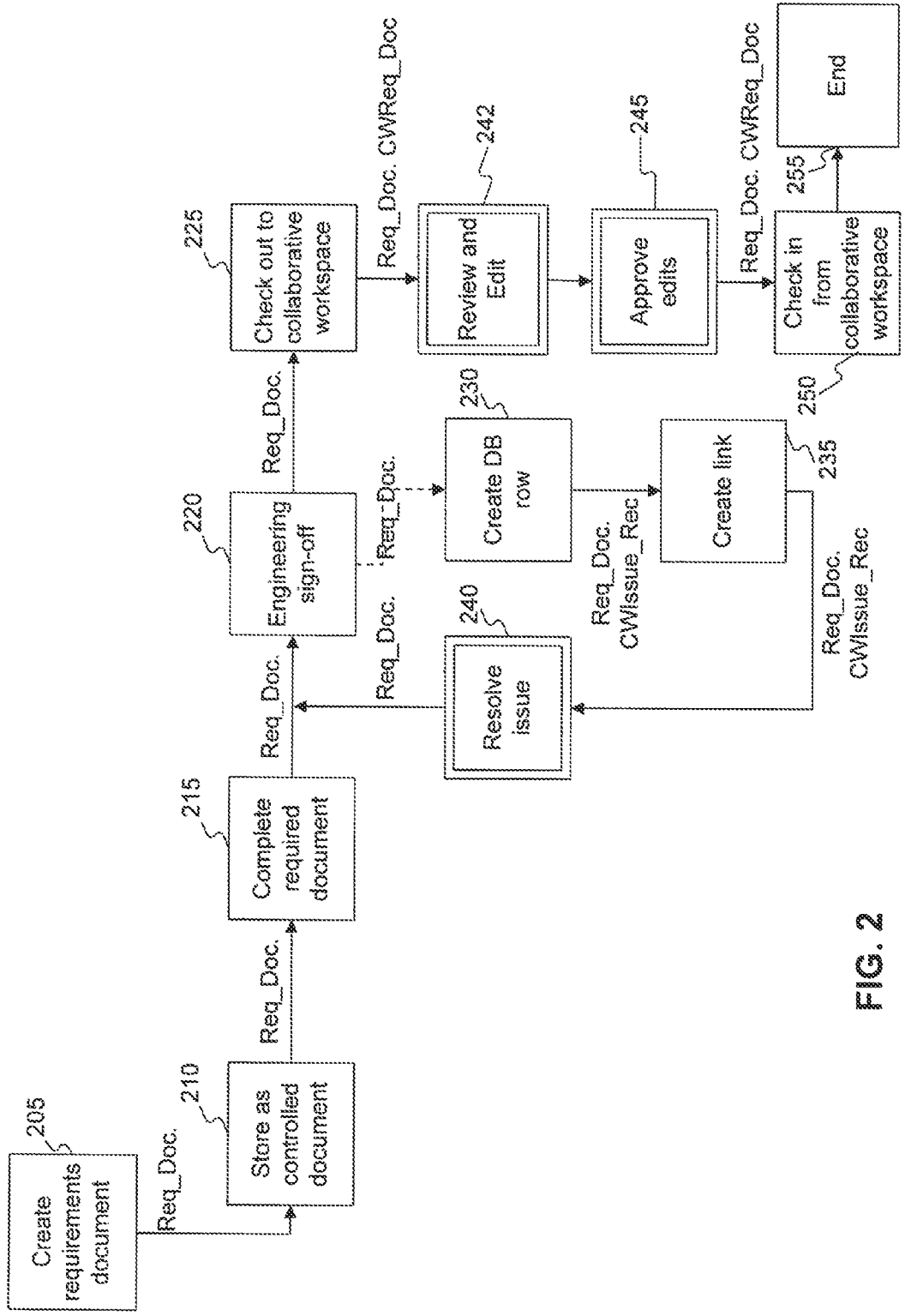
FIG. 2 is a chart of an exemplary collaborative BPM process consistent with the principles of the invention.

FIG. 2 is a chart of an exemplary collaborative BPM process consistent with the principles of the invention. The example of a workflow illustrated in FIG. 2 manages the development of a product requirements document that must first undergo an internal engineering department review, and then undergo a review by external business partners. If the engineers find problems with the document, they will collaborate with the product team to make revisions until the document is approved. After engineering approval, the external business partners collaborate to review the requirements document and perhaps modify it, to ensure that they can meet the requirements. While all this occurs, the document is under the control of the organization's content management system, and the collaboration is under control as well.

In one embodiment consistent with certain aspects of the present invention, a designer creates a business process, such as the business process shown in FIG. 2, with tools and items that allow collaborative workspaces and objects to be workitems and process data, respectively, in a business process that can dynamically create the needed collaborative workspaces and objects as it executes.

As shown in FIG. 2, the workflow begins when an author creates a requirements document (205). For example, a product planner (or team) may draft the requirements for a new cellular telephone. After the initial draft is created, the BPM system automatically stores the requirements document as a controlled document in, for example, an enterprise content management (ECM) system (210). The author works on the initial draft and when finished, indicates to the BPM system that it is complete (215).

The BPM system initiates the engineering sign-off task (220), passing the requirements document as an input, for the engineering department to approve or reject the requirements document. In the embodiment shown, if engineering signs off on the requirements document, then no internal collaborative workspace workitem is created and the workflow proceeds to items for external review. If, on the other hand, engineering flags a problem issue to be resolved, then the BPM process automatically prepares a context for a collaboration by dynamically creating a data table row (e.g., an issue record) to keep track of the issue flagged by engineering (230) and creating a link to and places a link to the document within the newly created collaborative object (235). In this example, these two discrete steps in the structured workflow create collaborative objects.

The BPM system then creates a collaborative workspace to resolve the issue (double-lined box 240), including the data table row, link, and requirements document as the initial context for the workspace. In one embodiment consistent with the invention, a collaborative workspace is a shared, online, network-based team environment with collaborative objects as the process data providing the medium of collaboration for the participants, such as the eRoom™ product from Documentum™ and the Documentum™ content server product line. Documentation related to the eRoom™ product is included in U.S. Provisional Application No. 60/626,096, which is incorporated herein by reference. Using the shared collaborative objects, participants can collaborate in a free-form way to perform a specific task in an environment associated with the structured BPM workflow. The collaborative objects are associated with the BPM system as process data, so they may be stored, retrieved, content managed, reviewed, audited, etc. just like traditional business process items. The collaborative objects are within the overall BPM system, forming a record of the collaboration and preserving collaboration information. Further, because the collaborative objects are distinct from other objects, there is no need to rely on the capabilities of other objects for recording or preserving collaborative activity or information, which capabilities may or may not exist depending on the object.

In one embodiment consistent with the invention, collaborative objects include shared folders, discussion threads, collaborative data tables and their components (e.g., task lists or a single task, issue lists or a single issue, change order lists or a single change order, etc.), team calendars and their components (e.g., a calendar that records events such as a meeting corresponding to the business process step "conduct meeting" on specified date), polls, and votes, among other things.

In one embodiment consistent with the invention, polls and votes may be dynamically structured. For example, collaboration participants may be polled for their top three suggestions for resolving a problem, and the collaborative workspace could then construct a vote using the poll information to determine the most popular suggestion as a process data object in a business process. In another embodiment, the collaborative workspace may be a workitem in a business process that allows participants to log into a problem resolution discussion thread for three days, and after three days conduct a vote to select the top two suggestions offered during the discussion, as identified by discussion thread or a data table row or record.

In one embodiment consistent with the invention, participants may create new collaborative objects as needed, using the capabilities provided by the collaborative workspace. For example, a participant may start a discussion thread to brainstorm ideas for solving a problem. The thread is a new collaborative object that is managed by the BPM system as process data.

In some embodiments consistent with the invention, the effects of the collaborative activity in a collaborative workspace may be automatically reflected in the parent BPM process. For example, a product team, as a result of a collaborative activity, may decide to incorporate new feature into a product. This decision may lead to a host of new activities, such as changes in the scheduled product release date and intermediate milestones. The BPM system may generate new schedules and cost metrics based on information associated with the collaborative new feature decision and modify the workflow processing accordingly.

In some embodiments, only invited participants have access to a collaborative workspace and its shared collaborative objects. Participants may include people outside an organization, such as customers, prospects, and suppliers, as well as an organization's employees.

In some embodiments, the BPM system draws participants to the collaborative workspace workitem by assigning them a workflow task and providing access to the collaborative workspace and associated objects. In one embodiment consistent with the invention, a participant is notified of collaborative workflow tasks via a workflow activity inbox or via email. For example, the BPM system may email to a designated participant a description of the task, e.g., resolve engineering issues, with attached collaborative objects, such as a collaborative workspace access link, an engineering discussion thread link, an issue-tracking data table record, a meeting schedule, etc., that can help resolve the issues. Thus, for example, the cellular telephone product planner, an LCD engineer, and a battery engineer may all receive emails directing them to the collaborative workspace workitem, where they can together resolve an issue of whether battery life is unacceptably short given the power consumption imposed by the initial requirements document. The email may contain a discussion thread link for joining an ongoing discussion about power consumption. In another embodiment consistent with the invention, new participants may be added dynamically to the collaborative workspace by existing participants. New participants may be needed, for example, to address new issues first realized during the collaboration process.

As shown in FIG. 2, once the issue is resolved, the BPM system returns to the engineering sign-off activity (220) for approval of the document. The process data, including the modified requirements document and the collaboration objects, are output from the resolve issue collaboration activity (240) and input to the engineering sign off task (220). Through the collaborative objects, the engineering department has access to the information related to the collaboration that produced the modified specification, which it may use to help with its sign-off approval decision. For example, engineering may review in context the original problem version of the requirements document, a collaborative discussion thread object, a to-do list object generated in the collaborative workspace, an issue list object generated in the collaborative workspace, etc.

When engineering signs off on the requirements document, the BPM system automatically checks it out for an external collaborative workspace (225) (which may lock the document in the organization's content management system) and creates an external collaborative workspace activity for reviewing and editing (242) and for approving (245) the requirements document for final inclusion in the organization's content management system according to the business process workflow design.

Similar to the internal collaborative workspace for resolving engineering issues within the organization (240) described above, the BPM system automatically includes the checked-out requirements document as part of the context of the external collaborative workspace for the participants to use, assigns participants the task of participating in the collaboration, and notices them. Along with relevant members of the organization, participants in the external collaborative workspace may include outside vendors, customers, business partners, marketing companies, and consultants, among others. As with the internal collaborative workspace (240), the BPM system may provide access to the external collaborative workspace (242, 245) to track progress, etc. and preserve the communications and objects associated with external collaborative workspace (242, 245) for later use. Thus, for example, chip suppliers, LCD suppliers, battery suppliers, wholesalers, a marketing agency, and an advertising consultant may collaborate to review and edit the checked-out version of the new cellular telephone requirements document to make sure they can meet the requirements.

In some embodiments consistent with the invention, the BPM process manages collaborative activity to various degrees using schedules, timers, object status changes, etc. For example, collaborative workspace 245 for externally approving edits may have a schedule that allows participants to submit ideas and issues to a discussion thread for a period of time, and at the end of that period the discussion thread object is closed and set to read-only. So after the set period ends, the collaboration process moves to the next phase, and the discussion thread object continues to be available for reference, but participants can no longer contribute to it.

Then the outside collaboration workspace users approve the (possibly modified) checked-out requirements document, the BPM system may automatically check the document into the content management system (C50), ending the process (C55).

As FIG. 2 illustrates, embodiments consistent with the invention use collaborative workspaces and collaborative objects as workitems and process data in a structured business process. The BPM system integrates the collaborative objects into its structured processes, formalizing a collaborative activity or subprocess as part of a larger BPM process. Some embodiments of BPM systems consistent with invention may include automatic actions for creating collaborative workspaces, adding members to a collaborative workspace, linking files to a collaborative workspace, checking files in and out of a content server, and creating collaborative objects such as folders, discussions, and data table rows, among others. Other embodiments may have other automatic actions to facilitate collaboration.

One of ordinary skill will recognize that the collaborative business process design shown in FIG. 2 is exemplary and that the principles of the invention apply to any automated business process that involves a step that requires collaboration. For example, more complex business processes requiring additional instances of collaboration, review, and/or approval fall within the scope of the invention.

Figure 3:
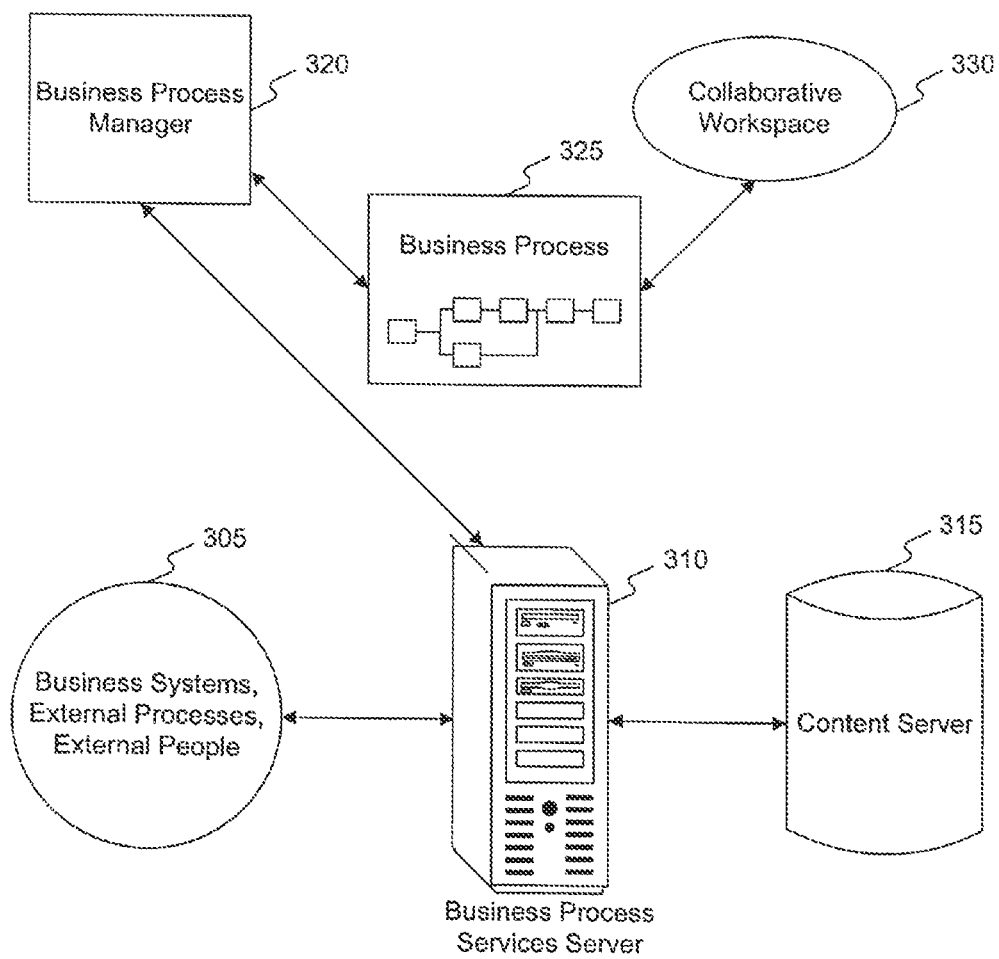
FIG. 3 is a diagram representing an exemplary architecture for implementing a collaborative BPM system consistent with the invention.

FIG. 3 is a diagram representing an exemplary architecture for implementing a collaborative BPM system consistent with the invention. In the example shown, an organization's business process services server 310 is communicatively connected with the organization's content server 315 and communicatively connected with other entities 305, such as business systems (e.g., an ERP system such as the SAP R3 system), external processes, (e.g., business partner review), and external people (e.g., customers via the Internet). Business process services server 310 hosts a business process manager application 320. Business process manager application 320 may implement a business process 325, such as, for example, a business process for creating a new product requirements document described in connection with FIG. 2. And business process 325 may create and/or communicate with a collaborative workspace 330, which may be accessible only to those inside an organization's firewall or accessible to either those inside or those outside the organization's firewall.

In one embodiment consistent with the invention, content server 315 stores an organization's content, such as business documents and data. In some embodiments, content server 315 may include a database and a database management system to allow real-time searching and retrieval of stored content.

An organization's content includes documents, data, and business objects. For example, the documents, data, and other objects associated with a loan origination process is content for a mortgage bank. The application for a loan is received as a document, as are credit reports, appraisals, and other supporting information requested from third parties. Additional documents, such as the note itself, are created once the loan is approved. During the loan origination process, data extracted from these documents may be stored and used by in the underwriting decision business process, such as business process 325, The bank uses a content server to retain the original documents themselves and other loan data, keeping them retrievable for non-repudiation, customer service, audit, compliance, and other business needs that may arise long after the origination process is complete.

In one embodiment consistent with the invention, business process services server 310 hosts the enterprise content management (ECM) software that controls access to the content on content server 315, as is known in the art. In other embodiments, content server 315 hosts ECM software.

In the embodiment shown, business process services server 310 hosts business process manager software 320, which interacts with ECM software to access the data on content server 315. In some embodiments, business process manager software 320 may include the ECM software. Business process manager software 320 provides business process management functions such as identifying and tracking business items as they move through each step of business process 325. Business process manager software 320 also integrates workitems, such as collaborative workspace 330, and associated process data, such as collaborative objects, into structured business process 325 and the ECM subsystem so that collaborative workspace 330 and its collaborative objects are part of the larger business process 325. In some embodiments, some or all of the functionality provided by business process manager 320 may be accessible over a network through a web browser and/or a graphical user interface.

In one embodiment consistent with the invention, business process manager software 320 creates objects corresponding to the data and documents routed to the BPM activity, including collaborative objects associated with collaborative workspace 330. These objects link to objects stored on content server 315, employing the security, versioning, renditioning, management, and other features associated with the system's ECM software. In such embodiments, the BPM/ECM software treats collaborative objects, such as shared documents, discussion threads, polls, votes, data tables, etc., as process data, similar to the way it treats traditional business process objects.

Figure 4:
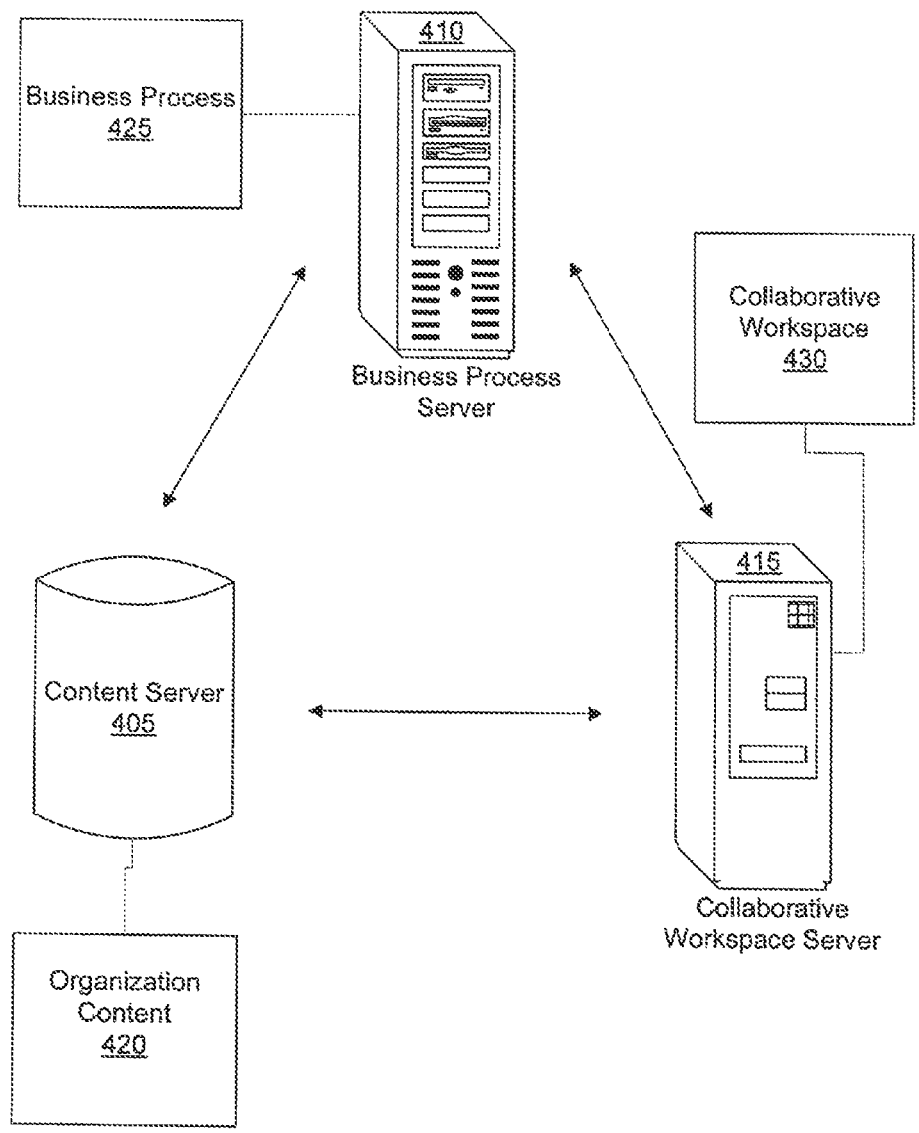
FIG. 4 is a diagram representing an exemplary system architecture for implementing embodiments consistent with the invention.

FIG. 4 is a diagram representing an exemplary system architecture for implementing embodiments consistent with the invention. As shown, a content server 405 is communicatively connected to a collaborative workspace server 415 and to a business process server 410. In addition, collaborative workspace server 415 is communicatively connected to business process server 410. Content server 405 stores organization content 420, business process server 410 hosts a business process 425, and collaboration workspace server 415 hosts a collaborative workspace 430. One of ordinary skill will recognize that other system architectures may also be used to implement embodiments consistent with the invention. For example, a single server, such as the Documentum™ content server stack, may implement the functionality of the three servers shown in FIG. 4 without departing from the scope of the invention.

Some embodiments consistent with the invention use the illustrated architecture to integrate or attach a collaborative object to a workflow using a "proxy" object type (i.e., a proxy to a collaborative object) in organization data 420 of content server 405, which is similar to a conventional business object type that can be attached as process data in a business process. In these embodiments, collaborative objects are on collaborative workspace server 415, distinct from business process server 410, and business process server 410 contains a proxy collaborative object used in business process 425 for each external collaborative object. In such embodiments, a "proxy" collaborative activity may be created in existing BPM environments, with a corresponding actual activity in a collaboration workspace. Actions taken or performed in the collaborative workspace are reflected through the proxy in the BPM environment, and vice-versa. In one embodiment consistent with the invention, the proxy may be implemented as a pointer in the BPM environment to the actual collaborative object in the collaborative workspace environment.

In one embodiment consistent with the invention, collaborative objects and collaborative workspaces may be added to an existing conventional BPM and/or ECM system(s) by adding extensions to the existing systems. For example, content server 405 may hold and control the actual collaborative business process content 420 and proxies in the software of business process 425 functionally integrate with corresponding objects in the software of collaborative workspace 430. Content server 405 may include proxy object extensions, which correspond to each collaborative object in a collaborative workspace 430. In this embodiment, content server 405 may also be extended to include new collaborative-workspace-reference object types, which include a name field, a URL for the collaborative object, and a collaborative workspace type, among other things.

In this embodiment, collaborative workspace server 415 also includes extensions to incorporate proxy functionality in collaborative workspace 430, for example, by receiving, processing, and responding to actions on BPM proxies, such as allowing remote login to, and communication with, collaborative workspace 430 via business process server 410, for example using XML APIs.

Similarly, business process server 410 includes an extension to allow communications with collaborative workspace server 415 and to allow commands from collaborative workspace server 415 to invoke workflow components in business process 425.

In this embodiment, business process server 410 may also include BPM design software extensions that allows developers to create workflows that include collaborative objects as process data and workspaces as workitems, such as the collaborative workflow shown in FIG. 2. When such a workflow executes on business process server 410 and/or content server 405, automated actions (such as create db row 230 and check out to external collaborative workspace 225 in FIG. 2) dispatch requests to collaborative workspace server 415, and collaborative workspace server 415 services the requests and returns data to the content server 405 and/or business process server 410. With this type of architecture, users of business process workflows executing on business process server 410 may transparently perform tasks on collaborative workspace server 415.

Although some embodiments of the invention are shown with triserver architectures, one of ordinary skill will recognize that other architectures can also be used to implement embodiments of the invention. For example, a single server, mainframe, or other data processing system could implement embodiments of the invention, or the invention's functions could be distributed between two computers or further distributed among more than three computers without departing from the scope of the invention.

Figure 5:
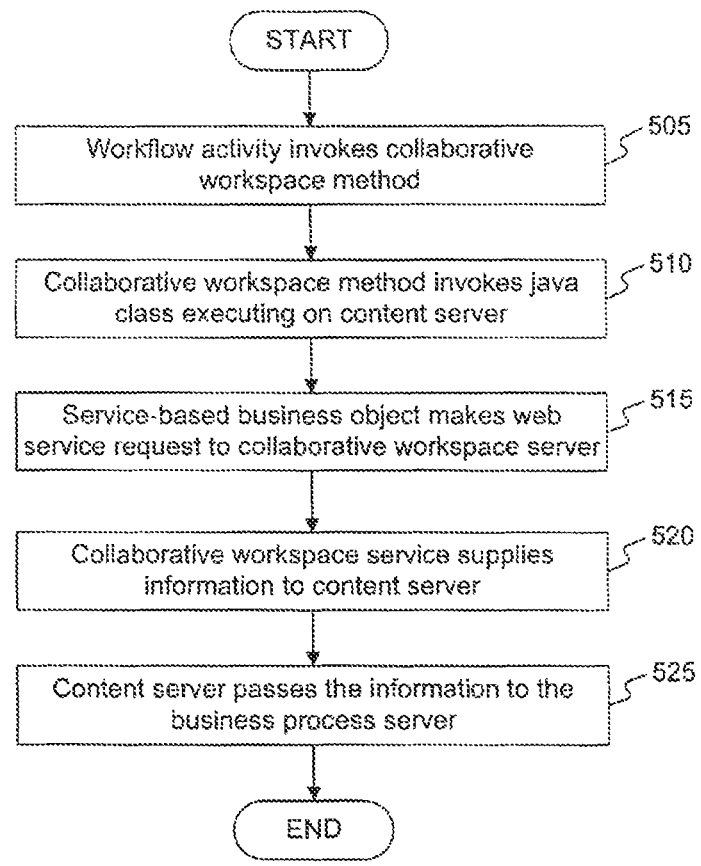
FIG. 5 is a flowchart of an exemplary process for interacting with a collaborative workspace from a business process consistent with the invention.

FIG. 5 is a flowchart of an exemplary process for interacting with a collaborative workspace from a business process consistent with the invention. In some embodiments, the process may be implemented on an architecture similar to those illustrated in FIG. 3 and FIG. 4. In the embodiment shown, the process begins with a workflow activity invoking a collaborative workspace method (step 505). In one embodiment consistent with the invention, the workflow activity is part of a business process hosted on a business process server, such as business process server 410 of FIG. 4, and the collaborative workspace method executes on the server as a java method.

During the next step of the process, the collaborative workspace method invokes a class, such as a java class, executing on a content server (step 510), such as content server 405 of FIG. 4. In one embodiment consistent with the invention, the classes may be customized by a user at workflow design time; i.e., the classes are available for specialization. This allows an implementer of a business process to use any combination of parameters or attributes from other objects of the workflow (e.g., documents or data table row) to drive the collaborative elements (e.g., by naming a collaborative issue something related to some information from a document).

The invoked class communicates with a service based business object on the content server to make a web service request to a collaborative workspace server (step F15), such as collaborative workspace server 415 in FIG. 4. The requests may create new, or configure existing, collaborative objects.

In response, a service running on the collaborative workspace server supplies requested information to the content server (step 520), and the content server passes the information to the business process server (step 525). The collaborative objects or items created or configured are thus associated with the business process.

Examples of collaborative workspace methods invokable to workflow activities include methods that create a collaborative workspace, add members to a collaborative workspace, check objects into a collaborative workspace, check objects out of a collaborative workspace, create a data table row (for example, create db row 230 in FIG. 2), create a folder, create a topic, and create a linked file. This list is not exhaustive, and other collaborative workspace methods are within the scope of the invention. Other steps in the workflow (for example, resolve issues 240 in FIG. 2) are manual, that is, they are assigned to users for execution. But, such steps may have a collaborative space object (e.g., a created data table row) as process data.

In one embodiment consistent with the invention, when a create collaborative workspace workflow method is invoked, the create collaborative workspace class creates a collaborative workspace, such as a Documentum™ eRoom™ workspace or a workspace created with the Documentum™ content server product line, via a web service request to a collaborative workspace server. In one embodiment consistent with the invention, when the request is completed, the newly-created collaborative workspace is added to the business process as a workitem, and access to the content object used to define the parameters for the collaborative workspace creation is eliminated. Thus, once the system creates a collaborative object and makes the original content available from within it, users will not merely work with only the content, they will work within a collaborative context, including the content.

In one embodiment consistent with the invention, when an add member workflow method is invoked, the add member class adds members to a collaborative workspace. In one embodiment consistent with the invention, the members to be added are obtained by querying for a list of all performers within the workflow.

In one embodiment consistent with the invention, when a check out to collaborative workspace method is invoked, the corresponding class automates the checkout of content server data to a collaborative workspace location. In one embodiment consistent with the invention, when the request is completed, the data is checked out of a CMS database and locked, and a copy is placed in the designated collaborative workspace location.

In one embodiment consistent with the invention, when a check in from collaborative workspace method is invoked, the corresponding check-in class automates the check in of data content from an object that is stored in a collaborative workspace. In one embodiment consistent with the invention, when the request is completed, the data is checked in to the CMS database and a reference to the object is returned.

In one embodiment consistent with the invention, when a create DB row workflow method is invoked, the corresponding class creates a collaborative workspace data table row. In one embodiment consistent with the invention, when the request is completed, the newly-created data table row is added to the business process as process data, and access to the content object used to define the parameters for the data table row creation is constrained such that the content object can only be accessed within the collaborative context, i.e., the data table row.

In one embodiment consistent with the invention, when a create folder workflow method is invoked, the corresponding class creates a collaborative workspace folder. In one embodiment consistent with the invention, when the request is completed, the newly-created folder is added to the business process as process data, and access to the content object used to define the parameters for the folder's creation is constrained such that the folder can only be accessed within the collaborative context, i.e., the folder.

In one embodiment consistent with the invention, when a create link workflow method is invoked, the corresponding class creates a content link in a designated collaborative workspace container. In one embodiment consistent with the invention, when the request is completed, the newly-created content link is made available to subsequent workflow activities, which are presented to the user within the collaborative context.

Some of the described embodiments consistent with the present invention enable the creation, definition, addition, and integration of collaborative workspaces and objects to a conventional business process management environment. In some embodiments, collaborative workspaces may be pre-configured and associated with specific activities in a business process at business process design time. In other embodiments, pre-configured collaborative workspaces may be dynamically associated with an activity in a BPM workflow. For example, a user may create a collaborative workspace to invite comments on a document pertaining to a workflow task assigned to the user. The collaborative workspace may contain, for example, a discussion thread for comment exchange about the document and an electronically sharable copy of the document. In such an embodiment, the BPM system may store the objects, actions, events, and comments associated with the collaborative workspace as content associated with the document and the workflow, for example in an ECM repository.

Although some embodiments of the invention are described in terms of adding collaboration capabilities to existing BPM systems, other embodiments consistent with the invention include BPM systems designed from the beginning with collaborative capabilities and the ability to manage collaborative objects in the same way as traditional business objects and BPM systems based on combinations of embodiments. Those of ordinary skill will recognize that embodiments of the invention may be implemented with conventional coding techniques, such as standard classes, java, and http over the wire, applied to existing BPM systems to add the needed functionality or applied to new systems initially designed with the needed functionality.

Figure 6:
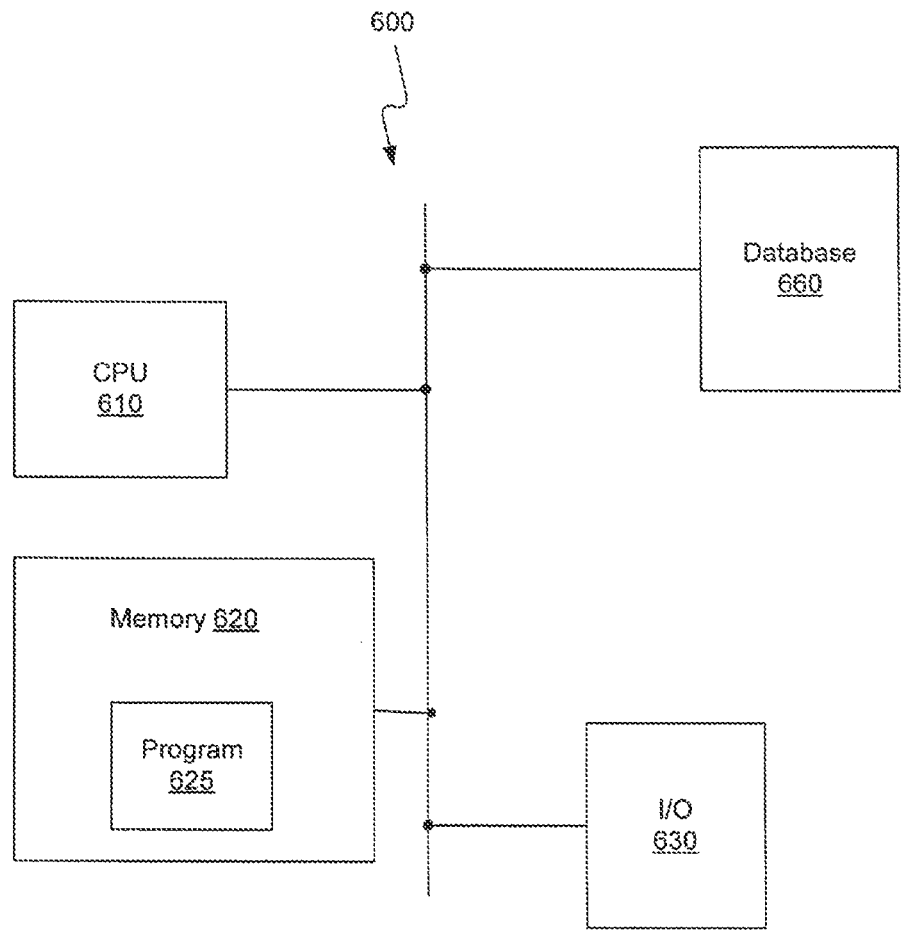
FIG. 6 illustrates an exemplary computing system that can be used to implement embodiments of the invention.

FIG. 6 illustrates an exemplary computing system 600 that can be used to implement embodiments of the invention. The components and arrangement, however, are not critical to the present invention.

System 600 includes a number of components, such as a central processing unit (CPU) 610, a memory 620, an input/output (I/O) device(s) 630, and a database 660 that can be implemented in various ways. For example, an integrated platform (such as a workstation, personal computer, laptop, etc.) may comprise CPU 610, memory 620 and I/O devices 630. In such a configuration, components 610, 620, and 630 may connect through a local bus interface and access to database 660 (implemented as a separate database system) may be facilitated through a direct communication link, a local area network (LAN), a wide area network (WAN) and/or other suitable connections. System 600 may be part of a larger BPM system, such as Documentum™ workflows by Documentum™.

CPU 610 may be one or more known processing devices, such as a microprocessor from the Pentium™ family manufactured by Intel™. Memory 620 may be one or more storage devices configured to store information used by CPU 610 to perform certain functions related to embodiments of the present invention. Memory 620 may be a magnetic, semiconductor, tape, optical, or other type of storage device. In one embodiment consistent with the invention, memory 620 includes one or more programs 625 that, when executed by CPU 610, perform various processes consistent with the present invention. For example, memory 620 may include a BPM program 625 that automatically creates and uses collaborative objects as part of a business process, or memory 620 may include a collaborative workspace program 625 that interacts with a BPM system, or memory 620 may include a ECM program 625 that stores and manages business objects and collaborative objects. Memory 620 may also include other programs that perform other functions, such as an accounting program the keeps the books of an organization and processes business data.

Methods, systems, and articles of manufacture consistent with the present invention are not limited to programs or computers configured to perform dedicated tasks. For example, memory 620 may be configured with a program 625 that performs several functions when executed by CPU 610. That is, memory 620 may include a program or programs 625 that performs BPM functions, collaborative workspace functions, and ECM functions. Alternatively, CPU 610 may execute one or more programs located remotely from system 600. For example, system 600 may access one or more remote programs that, when executed, perform functions related to embodiments of the present invention.

Memory 620 may also be configured with an operating system (not shown) that performs several functions well known in the art when executed by CPU 610. By way of example, the operating system may be Microsoft Windows™, Unix™, Linux™, an Apple Computers operating system, Personal Digital Assistant operating system such as Microsoft CE™, or other operating system. The choice of operating system, and to the use of an operating system, is not critical to the invention.

I/O device(s) 630 may comprise one or more input/output devices that allow data to be received and/or transmitted by system 600. For example, I/O device 630 may include one or more input devices, such as a keyboard, touch screen, mouse, and the like, that enable data to be input from a user. Further, I/O device 630 may include one or more output devices, such as a display screen, CRT monitor, LCD monitor, plasma display, printer, speaker devices, and the like, that enable data to be output or presented to a user. The configuration and number of input and/or output devices incorporated in I/O device 630 are not critical to the invention.

Database 660 may comprise one or more databases that store information and are accessed and/or managed through system 600. By way of example, database 660 may be an Oracle™ database, a Sybase™ database, or other relational database, or database 660 may be part of an ERP system. Systems and methods of the present invention, however, are not limited to separate databases or even to the use of a database, as data can come from practically any source, such as the internet and other organized collections of data.

Other implementations of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for integrating networked collaboration into a structured executing process, the method comprising:
    executing by a process server, a defined, multi-step process;
    for a first step of the defined, multi-step process, creating a new collaborative workspace on a collaborative workspace server based on executing the defined, multi-step process, the collaborative workspace server being distinct from the process server;
    hosting, by the collaborative workspace server, the new collaborative workspace, wherein the new collaborative workspace is a shared online environment accessible by a plurality of users;
    adding, by the process server, the new collaborative workspace to the defined, multi-step process as a workitem of the defined, multi-step process;
    executing, by the process server, a first collaborative workspace method to invoke a first class on a content server to create a new collaborative object on the collaborative workspace server, the new collaborative object being external to the process server;
    executing, by the content server, the first class to send a request to create the new collaborative object to the collaborative workspace server;
    creating, by the collaborative workspace server, the new collaborative object responsive to the request to create the new collaborative object, the new collaborative object accessible through the new collaborative workspace by the plurality of users;
    sending, by the collaborative workspace server, information for the new collaborative object to the content server
    receiving, by the content server, the information for the new collaborative object;
    creating a first reference object at the content server that links to the new collaborative object;
    storing, by the content server, content associated with the new collaborative workspace in a data store;
    passing, by the content server, the information for the new collaborative object to the process server;
    receiving, by the process server, the information for the new collaborative object;
    based on the information for the new collaborative object, creating, by the process server, a collaborative object first proxy object that points to the new collaborative object on the collaborative workspace server;
    using a proxy object type, attaching, by the process server, the collaborative object first proxy object to the defined, multi-step process as process data of the workitem, the collaborative object first proxy object enabling action taken or performed in the collaborative workspace at the collaborative workspace server to be reflected through the collaborative object first proxy object;
    passing, by process server, the process data of the workitem to a subsequent step of the defined, multi-step process; and
    receiving, processing and responding to an action on the collaborative object first proxy object by the collaborative workspace server.

2. The method of claim 1, wherein the request to create the new collaborative object is a web services request.

3. The method of claim 1, wherein the new collaborative object is a shared folder.

4. The method of claim 1, wherein the new collaborative object is a discussion.

5. The method of claim 1, wherein the new collaborative object is a data table.

6. The method of claim 1, wherein the new collaborative object is a data table entry.

7. The method of claim 1, further comprising:
    invoking, by the process server, a second collaborative workspace method that invokes a second class on the content server, the second class invokable to send, to the collaborative workspace server, a request to modify an existing collaborative object;
    executing, by the content server, the second class to send, to the collaborative workspace server, the request to modify the existing collaborative object;
    modifying, by the collaborative workspace server, the existing collaboration object responsive to the request to modify the existing collaborative object;
    returning, by the collaborative workspace server, the information for the existing collaboration object to the content server; and
    passing, by the content server, the information for the existing collaborative object to the process server.

8. A system for integrating networked collaboration comprising:
    a process server comprising process server software including a first collaborative workspace method, the process server communicatively coupled to a content server and a collaborative workspace server, the process server hosting a defined, multi-step process executable to invoke a first collaborative workspace method that invokes a first class on the content server, the first class invokable to send, to the collaborative workspace server, a request to create a new collaborative object;
    a data store coupled to the content server;
    wherein the defined, multi-step process, is executable by the process server to:
        for a first step of the defined, multi-step process, create a new collaborative workspace on the collaborative workspace server;
        add the new collaborative workspace to the defined, multi-step process as a workitem of the defined, multi-step process;
        execute the first collaborative workspace method to invoke the first class to create the new collaborative object on the collaborative workspace server;
        receive, from the content server, information for the new collaborative object;
        based on the information for the new collaborative object, create a collaborative object first proxy object at the process server that points to the new collaborative object;
        using a proxy object type, attach the collaborative object first proxy object to the defined, multi-step process as process data of the workitem, the collaborative object first proxy object enabling action taken or performed in the collaborative workspace at the collaborative workspace server to be reflected through the collaborative object first proxy object;
        pass the process data of the workitem to a subsequent step of the defined, multi-step process;
    wherein the content server comprises content server software executable to:
        store content associated with the new collaborative workspace in the data store;
        execute the first class to send the request to the collaborative workspace server to create the new collaborative object;

receive, responsive to the request to create the new collaborative object, the information for the new collaborative object;

create a first reference object at the content server that links to the new collaborative object;

pass the information for the new collaborative object to the process server;

wherein the collaborative workspace server comprises collaborative workspace server software executable to:

host the new collaborative workspace, wherein the new collaborative workspace is a shared online environment accessible by a plurality of users;

create the new collaborative object responsive to the request to create the new collaborative object, the new collaborative object accessible through the new collaborative workspace by the plurality of users;

provide the information for the new collaborative object to the content server; and receive, process and respond to an action on the collaborative object first proxy object.

9. The system of claim 8, wherein the request to create the new collaborative object is a web services request.

10. The system of claim 8, wherein the new collaborative object is a shared folder.

11. The system of claim 8, wherein the new collaborative object is a discussion.

12. The system of claim 8, wherein the new collaborative object is a data table.

13. The system of claim 8, wherein the new collaborative object is a data table entry.

14. The system of claim 8, wherein the new collaborative object is a team calendar.

15. The system of claim 8, wherein the new collaborative object is an event.

16. The system of claim 8, wherein the new collaborative object is a poll.

17. The system of claim 8, wherein the new collaborative object is a vote.

18. The system of claim 8, wherein the request to modify the existing collaborative object is a web services request.

19. The system of claim 8, wherein the first class is a first Java class and the second class is a second Java class.

20. The system of claim 8, wherein the defined, multi-step process is executable to invoke a second collaborative workspace method that invokes a second class on the content server, the second class invokable to send, to the collaborative workspace server, a request to modify an existing collaborative object;

wherein the process server software is executable to:
receive, from the content server, information for the existing collaboration object;

wherein the content server software is executable to:
execute the second class to send, to the collaborative workspace server, the request to modify the existing collaborative object;

receive, responsive to the request to modify the existing collaborative object, the information for the existing collaboration object; and pass the information for the existing collaborative object to the process server;

wherein the collaborative workspace server software is executable to:
modify the existing collaboration object responsive to the request to modify the existing collaborative object; and return the information for the existing collaboration object to the content server.

* * * * *